(12) United States Patent
Lai

(10) Patent No.: US 10,565,467 B2
(45) Date of Patent: *Feb. 18, 2020

(54) EXTRACTING WELL LOG DATA

(71) Applicant: Drilling Info, Inc., Austin, TX (US)

(72) Inventor: Yenming Mark Lai, Austin, TX (US)

(73) Assignee: Drilling Info, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/506,619

(22) Filed: Jul. 9, 2019

(65) Prior Publication Data
US 2019/0332885 A1 Oct. 31, 2019

Related U.S. Application Data

(63) Continuation of application No. 15/921,497, filed on Mar. 14, 2018, now Pat. No. 10,445,617.

(51) Int. Cl.
*G06K 9/62* (2006.01)
*G06T 7/11* (2017.01)

(52) U.S. Cl.
CPC .............. *G06K 9/6201* (2013.01); *G06T 7/11* (2017.01); *G06K 2209/01* (2013.01); *G06T 2207/10024* (2013.01); *G06T 2207/20132* (2013.01); *G06T 2207/30176* (2013.01)

(58) Field of Classification Search
CPC .... G06K 9/6201; G06K 2209/01; G06T 7/11; G06T 2207/10024; G06T 2207/20132; G06T 2207/30176
See application file for complete search history.

(56) References Cited

U.S. PATENT DOCUMENTS

| 5,648,937 | A | 7/1997 | Campbell |
| 5,664,109 | A | 9/1997 | Johnson |
| 6,922,487 | B2 | 7/2005 | Dance |
| 7,069,240 | B2 | 6/2006 | Spero et al. |
| 8,385,604 | B2 | 2/2013 | Orpen |
| 9,628,661 | B2 | 4/2017 | Dolev |

(Continued)

FOREIGN PATENT DOCUMENTS

| CN | 10587447 | 8/2016 |
| WO | WO2001/013279 | 2/2001 |
| WO | WO2017/214073 | 12/2017 |

OTHER PUBLICATIONS

Docparser, "Using Zonal OCR to Extract Data Fields From Scanned Documents", 2018, 9 pages.
(Continued)

*Primary Examiner* — Leon Flores
(74) *Attorney, Agent, or Firm* — Fish & Richardson P.C.

(57) ABSTRACT

Techniques for extracting well log data include cropping one or more portions of a page of a well log file image that includes solid color space; further cropping portions of the page that includes well log file data from the cropped page of the well log file image; executing an optical character recognition (OCR) technique on the cropped portions of the page that includes well log file data to generate an OCR'd image of the cropped portions of the page that includes well log file data; parsing the well log file data from the OCR'd image; and comparing the parsed well log file data against one or more well log file data-specific rules to determine user-specified well log file data from the parsed well log file data.

22 Claims, 15 Drawing Sheets

(56) References Cited

U.S. PATENT DOCUMENTS

| | | |
|---|---|---|
| 2013/0262968 A1 | 10/2013 | Gartman et al. |
| 2016/0028921 A1 | 1/2016 | Thrasher |
| 2017/0351913 A1 | 7/2017 | Chen |
| 2017/0236034 A1 | 8/2017 | Dolev |
| 2018/0293438 A1* | 10/2018 | Ortiz ................. G06K 9/00476 |

OTHER PUBLICATIONS

International Search Report and Written Opinion in International Application No. PCT/US2019/019403, dated Jun. 12, 2019, 11 pages.
Neuralog, "Neuralog Products", 2018, 2 pages.

* cited by examiner

All interpretations of log data are opinions based on inferences from electrical or other measurements. we do not guarantee the accuracy or correctness of any interpretation or recommendation and we shall not be liable or response for any loss, cost, damages or expenses incurred or sustained by anyone resulting from any interpretation or recommendation made by any of our employees or agents.

REMARKS      Rig: NABORS #141      Service Order # 03484044

Drilling Stopped 12:00/14    Circulation Stopped 14:00/15    Tool on Bottom 03:00/16    BHT 138 °F    Prints: 5
HBC/DLL/MSFL/SPED/CNT/GR LOGGED IN COMBINATION.
PRESENTATIONS AND LOGGED INTERVALS AS PER CUSTOMER REQUEST.
NEUTRON CORRECTED FOR CASING AT 4994FT 13.375IN & 68LB.
LIMESTONE MATRIX OF 2.71 g/cc USED FOR POROSITY.
47.6 ms/ft USED FOR SONIC POROSITY.
MICRO-SPHERICALLY FOCUSED LOG READINGS AFFECTED AT TIMES BY LARGE BOREHOLE.

THANK YOU FOR CHOOSING COMPUTALOG.

Rwa Parameters: a _____ m _____
Porosity _____ Resistivity _____

Hole Volume Presented in Depth Track
Open Hole volume on the Left
Annular Volume on the Right
Annular Volume for 9.625" Casting
Large Ticks Represent 100 cu feet.
Small ticks represent 10 cu feet.

— 401

EQUIPMENT DATA

| Run No. | Tool Type | Tool No. | Other |
|---|---|---|---|
| ONE | HBCL | 139 | CENTRALIZED |
|  | DLL | 103103 |  |
|  | MSFL | 132142 |  |
|  | SPED | 108108 | 2966-GW |
|  | CNT | 189 | 287-NN |
|  | GR | 106 | RA-20S-362 |

FIG. 4A (Cont.)

| 38932297 | | ID: 209083 | | ⑥ |
|---|---|---|---|---|
| COMPUTALOG Wireline Services | | SPECTRAL PE DENSITY COMPENSATED NEUTRON LOG | | |
| COMPANY | PURE RESOURCES | | | |
| WELL | RAPE 13-2H | | | |
| FIELD | WAHA, WEST (DEVONIAN) | | | |
| COUNTY | REEVES  D-08 | STATE TEXAS | | |
| Location | 628' FNL & 773' FEL SECTION 13, BLOCK C3 PSL SURVEY A-1294 | | Other Services: HBC DLL/MSFL | |
| API | 42-389-32297 | | | |
| SEC. N/A    TWP N/A    RGE N/A | | | | |
| Perm. Datum GROUND LEVEL  Elev. 2601  ft Log measured from K.B., 30  ft above Permanent Datum. | | | ELEV.K.B. 2631 ft D.F. 2630 ft G.L. 2601 ft | |
| Date | APRIL 15, 2004 | | | |
| Run No. | ONE | | | |
| Bot. Driller | 10500 ft. | ft. | ft. | |
| Bot. Logger | 10500 ft. | ft. | ft. | |
| First Reading | 10440 ft. | ft. | ft. | |
| Last Reading | 0 ft. | ft. | ft. | |
| Log Interval | 10440 ft. | ft. | ft. | |
| Csg. Driller | 13.375in.@ 4996 ft. | in.@   ft. | in.@   ft. | |
| Csg. Logger | 4994 ft. | ft. | ft. | |
| Bit Size | 12.250in. | in. | in. | |
| Fluid Type | BRINE | | | |
| Dens. | Visc. | 10.2 lbm/gal | 30s | lbm/gal | S | lbm/gal | S |
| pH | Fluid Loss | 12.0 | 9.6 cc | | cc | | cc |
| Sample Source | MUD PIT - MEASURED | | | |
| Rm @Temp:-meas | 0.75 ohm-m @ 75 °F | ohm-m @  °F | ohm-m @  °F | |
| Rmf @Temp:-meas | N/A ohm-m @ N/A °F | ohm-m @  °F | ohm-m @  °F | |
| Rmc @Temp:-meas | N/A ohm-m @ N/A °F | ohm-m @  °F | ohm-m @  °F | |
| Rm @BHT :-calc | 0.43 ohm-m @ 138 °F | ohm-m @  °F | ohm-m @  °F | |
| Rmf @BHT :-calc | N/A ohm-m @ N/A °F | ohm-m @  °F | ohm-m @  °F | |
| Last Circ. | APRIL 15 - 1400hrs. | hrs. | hrs. | |
| Max Rec. Temp | 138 °F | °F | °F | |
| Operating Time | 6.0  hrs. | hrs. | hrs. | |
| Unit # | Loc. | 386 | ODESSA | | | | |
| Recorded By | G. ROBEY | | | |
| Witnessed By | M. METCALF | | | |

| 38932297 | ID: 209083 | ⑥ |

| COMPUTALOG Wireline Services | SPECTRAL PE DENSITY COMPENSATED NEUTRON LOG |

| COMPANY PURE RESOURCES | | |
|---|---|---|
| WELL RAPE 13-2H | | |
| FIELD WAHA, WEST (DEVONIAN) | | |
| COUNTY REEVES D-08 STATE TEXAS | | |
| Location 628' FNL & 773' FEL SECTION 13, BLOCK C3 PSL SURVEY A-1294 | Other Services: HBC DLL/MSFL | |
| API 42-389-32297 | | |
| SEC. N/A TWP N/A RGE N/A | | |
| Perm. Datum GROUND LEVEL Elev. 2601 ft | ELEV.K.B. 2631 ft | |
| Log measured from K.B., 30 ft above Permanent Datum. | D.F. 2630 ft G.L. 2601 ft | |

(Left side vertical labels: COMPANY PURE RESOURCES / WELL RAPE 13-2H / FIELD WAHA, WEST (DEVONIAN) / COUNTY REEVES / STATE TEXAS)

| Date | APRIL 15, 2004 | | |
|---|---|---|---|
| Run No. | ONE | | |
| Bot. Driller | 10500 ft. | ft. | ft. |
| Bot. Logger | 10500 ft. | ft. | ft. |
| First Reading | 10440 ft. | ft. | ft. |
| Last Reading | 0 ft. | ft. | ft. |
| Log Interval | 10440 ft. | ft. | ft. |
| Csg. Driller | 13.375in.@ 4996 ft. | in.@ ft. | in.@ ft. |
| Csg. Logger | 4994 ft. | ft. | ft. |
| Bit Size | 12.250in. | in. | in. |
| Fluid Type | BRINE | | |
| Dens. | Visc. | 10.2 lbm/gal | 30s | lbm/gal | s | lbm/gal | S |
| pH | Fluid Loss | 12.0 | 9.6 cc | | cc | | cc |
| Sample Source | MUD PIT - MEASURED | | |
| Rm @Temp:-meas | 0.75 ohm-m @ 75 °F | ohm-m @ °F | ohm-m @ °F |
| Rmf @Temp:-meas | N/A ohm-m @ N/A °F | ohm-m @ °F | ohm-m @ °F |
| Rmc @Temp:-meas | N/A ohm-m @ N/A °F | ohm-m @ °F | ohm-m @ °F |
| Rm @BHT :-calc | 0.43 ohm-m @ 138 °F | ohm-m @ °F | ohm-m @ °F |
| Rmf @BHT :-calc | N/A ohm-m @ N/A °F | ohm-m @ °F | ohm-m @ °F |
| Last Circ. | APRIL 15 - 1400hrs. | hrs. | hrs. |
| Max Rec. Temp | 138 °F | °F | °F |
| Operating Time | 6.0 hrs. | hrs. | hrs. |
| Unit # | Loc. | 386 | ODESSA | | |
| Recorded By | G. ROBEY | | |
| Witnessed By | M. METCALF | | |

| | |
|---|---|
| NIAN) | |
| STATE TEXAS | |
| | Other Services:<br>HBC<br>DLL/MSFL |
| A | |
| Elev . 2601 ft<br>ft above | ELEV.K.B. 2631 ft<br>D.F. 2630 ft<br>G.L. 2601 ft |
| | |
| | |
| ft. | ft. |
| ft. RECEIVED | ft. |

```
Perm.  Datum GROUND LEVEL  Elev. 2601   ft
Log measured from K.B. , 30    ft above
Permanent Datum.
```

412d

```
ELEV.K.B.2631  ft
     D.F.2630  ft
     G.L.2601  ft
```

412b

```
Other Services:
 HBC
 DLL/MSFL
```

412a

```
Location  628' FNL & 773' FEL
          SECTION 13, BLOCK C3
          PSL SURVEY A-1294
API  42-389-32297
SEC. N/A      TWP N/A    RGE N/A
```

FIG. 4G

EXTRACTING WELL LOG DATA

CROSS-REFERENCE TO RELATED APPLICATION

This application is a continuation of, and claims priority under 35 U.S.C. § 120 to, U.S. patent application Ser. No. 15/921,497, filed on Mar. 14, 2018, the entire contents of which is incorporated by reference herein.

TECHNICAL FIELD

This document relates to systems and methods for extracting well log data and more particularly, extracting elevation data from a well log file, such as Kelly bushing elevation data.

BACKGROUND

Well log files stored or found in digital representations are typically images comprised of multiple pages, and in most cases, several hundred pages. The well log file contains information, for example, about a well that has been drilled and completed, such as geological measurements (e.g., resistivity, gamma) as well as information about the well itself (e.g., owner, legal description of land). Some data from the well log filed may be desired to determine characteristics about the well.

SUMMARY

In an example implementation, a structured data processing system for extracting well log data that includes one or more hardware processors and a memory in communication with the one or more hardware processors, the memory storing a data structure and an execution environment. The data structure includes an image of a well log file. The execution environment includes a well log data solver configured to perform operations including: cropping one or more portions of a particular page of the well log file image that includes solid color space; further cropping one or more portions of the particular page that includes well log file data from the cropped particular page of the well log file image; executing an optical character recognition (OCR) technique on the cropped one or more portions of the particular page that includes well log file data to generate an OCR'd image of the cropped one or more portions of the particular page that includes well log file data; parsing the well log file data from the OCR'd image; comparing the parsed well log file data against one or more well log file data-specific rules to determine user-specified well log file data from the parsed well log file data; a user interface module that generates a user interface that renders one or more graphical representations of the determined user-specified well log file data; and a transmission module that transmits, over one or more communication protocols and to a remote computing device, data that represents the one or more graphical representations.

In an aspect combinable with the example implementation, the well log data solver is configured to perform further operations including manipulating the well log file image to vertically orient the particular page of the well log file image.

In another aspect combinable with any one of the previous aspects, the well log data solver is configured to perform further operations including identifying, from a remote computing system, an identification of the user-specified well log file data.

In another aspect combinable with any one of the previous aspects, identifying the identification of the user-specified well log file data includes receiving, from the remote computing system, the identification of the user-specified well log file data.

In another aspect combinable with any one of the previous aspects, the user-specified well log file data includes well elevation data.

In another aspect combinable with any one of the previous aspects, the elevation data includes Kelly Bushing elevation data.

In another aspect combinable with any one of the previous aspects, the particular page includes a first page of the well log file image.

In another aspect combinable with any one of the previous aspects, the well log data solver is configured to perform further operations including increasing a dots per inch (dpi) value of the particular page to at least 400 dpi.

In another aspect combinable with any one of the previous aspects, the operation of cropping one or more portions of the particular page of the well log file image that includes solid color space includes cropping one or more solid white portions of the particular page; and cropping one or more solid black portion of the particular page.

In another aspect combinable with any one of the previous aspects, at least one or more of the solid white portions or solid black portions is part of a side or a top of the particular page.

In another aspect combinable with any one of the previous aspects, the operation of cropping one or more portions of a particular page of the well log file image that includes solid color space further includes measuring a number of pixels at a top of the particular page; vertically cropping the particular page so that a top-to-side length ratio of the particular page is 8.5 in. to 6.25 in.; determining a text orientation of the cropped particular page; and based on the determination, rotating the cropped particular page so that the text orientation is vertical.

In another aspect combinable with any one of the previous aspects, the operation of further cropping one or more portions of the particular page that includes well log file data from the cropped particular page of the well log file image includes further cropping a first portion of the cropped particular page that includes a first representation of the user-specified well log file data; and further cropping a second portion of the cropped particular page that includes a second representation of the user-specified well log file data.

In another aspect combinable with any one of the previous aspects, the well log data solver is configured to perform further operations including: identifying a first area of the cropped particular page that encloses the first portion; determining the first portion in the first area based on a delineated size or shape of the first portion; identifying a second area of the cropped particular page that encloses the second portion; and determining the second portion in the second area based on a delineated size or shape of the second portion.

In another aspect combinable with any one of the previous aspects, the well log data solver is configured to perform further operations including cropping a remaining portion of the first area excluded by the delineated size or shape of the first portion from the cropped particular page; and cropping a remaining portion of the second area excluded by the delineated size or shape of the second portion from the cropped particular page.

In another aspect combinable with any one of the previous aspects, the operation of executing the OCR technique on the cropped one or more portions of the particular page that includes well log file data to generate an OCR'd image of the cropped one or more portions of the particular page that includes well log file data includes determining that a dots per inch (dpi) setting value of the cropped particular page meets a threshold setting value for the OCR technique; determining that the cropped particular page includes metadata that includes the dpi setting; and executing the OCR technique on the first and second portions of the cropped particular page generate an OCR'd image of the first and second portions that include the first and second representations of the user-specified well log file data.

In another aspect combinable with any one of the previous aspects, the operation of parsing the well log file data from the OCR'd image includes parsing the OCR'd image of the first portion to determine a first set of separate values of each of one or more terms of interest included in the first representation of the user-specified well log file data; and parsing the OCR'd image of the second portion to determine a second set of separate values for each of the one or more terms of interest included in the second representation of the user-specified well log file data.

In another aspect combinable with any one of the previous aspects, the operation of comparing the parsed well log file data against one or more well log file data-specific rules to determine user-specified well log file data from the parsed well log file data includes assigning a numerical point value based on the well log file data-specific rules to each of the one or more terms of interest; and scoring, according to the assigned numerical point value of each of the one or more terms of interest.

In another aspect combinable with any one of the previous aspects, each of a plurality of combinations of the one or more terms includes the first and second number of each of the one or more terms.

In another aspect combinable with any one of the previous aspects, each combination is a unique combination of values from the first and second sets of separate values of the one or more terms of interest.

Another aspect combinable with any one of the previous aspects further includes sorting the scored plurality of combinations to determine a best score.

Another aspect combinable with any one of the previous aspects further includes identifying the unique combination of values of the one or more terms of interest associated with the combination having the best score.

Another aspect combinable with any one of the previous aspects further includes setting the identified unique combination of values of the one or more terms of interest to the determined user-specified well log file data.

In another aspect combinable with any one of the previous aspects, at least one of the well log file data-specific rules is based on a physical property of one of the one or more terms of interest, the physical property defined by a range of values.

In another aspect combinable with any one of the previous aspects, the well log data solver is configured to perform further operations including prior to assigning the numerical point value, filtering the first and second sets of separate values of the one of the one or more terms of interest based on the physical property.

In another aspect combinable with any one of the previous aspects, the operation of filtering the first and second sets of separate values of the one of the one or more terms of interest based on the physical property includes comparing each value of the one of the one or more terms of interest with the range of values; and based on the compared value being within the range of values, assigning the compared value to one of the plurality of combinations.

In another aspect combinable with any one of the previous aspects, the well log data solver is configured to perform further operations including based on the compared value being outside of the range of values, excluding the compared value from all of the plurality of combinations.

Implementations may also include systems or computer programs. For example, a system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions stored on non-transitory computer-readable media that, when executed by data processing apparatus, cause the apparatus to perform the actions.

One, some, or all of the implementations according to the present disclosure may include one or more of the following features. For example, a computer-implemented well log file solver according to the present disclosure may provide well log file data to a user based on a query, where such data is otherwise unattainable without extensive human evaluation time and efforts. As another example, a computer-implemented well log file solver according to the present disclosure may provide for more accurate well log file data as compared to bare OCR techniques due to, for example, a confidence score being given to each possible combination of well log data.

The details of one or more embodiments are set forth in the accompanying drawings and the description below. Other features, objects, and advantages will be apparent from the description and drawings, and from the claims.

DESCRIPTION OF DRAWINGS

FIGS. 4A-4G are images of an example well log data file processed in the example processes according to FIGS. 2 and 3A-3E.

DETAILED DESCRIPTION

This document discusses techniques (e.g., computer-implemented method, computer program product, computer system) for providing well log file data to a user in response to a query for specific data, such as well elevation data or other information associated with the well recorded by the well log.

Figure 1:
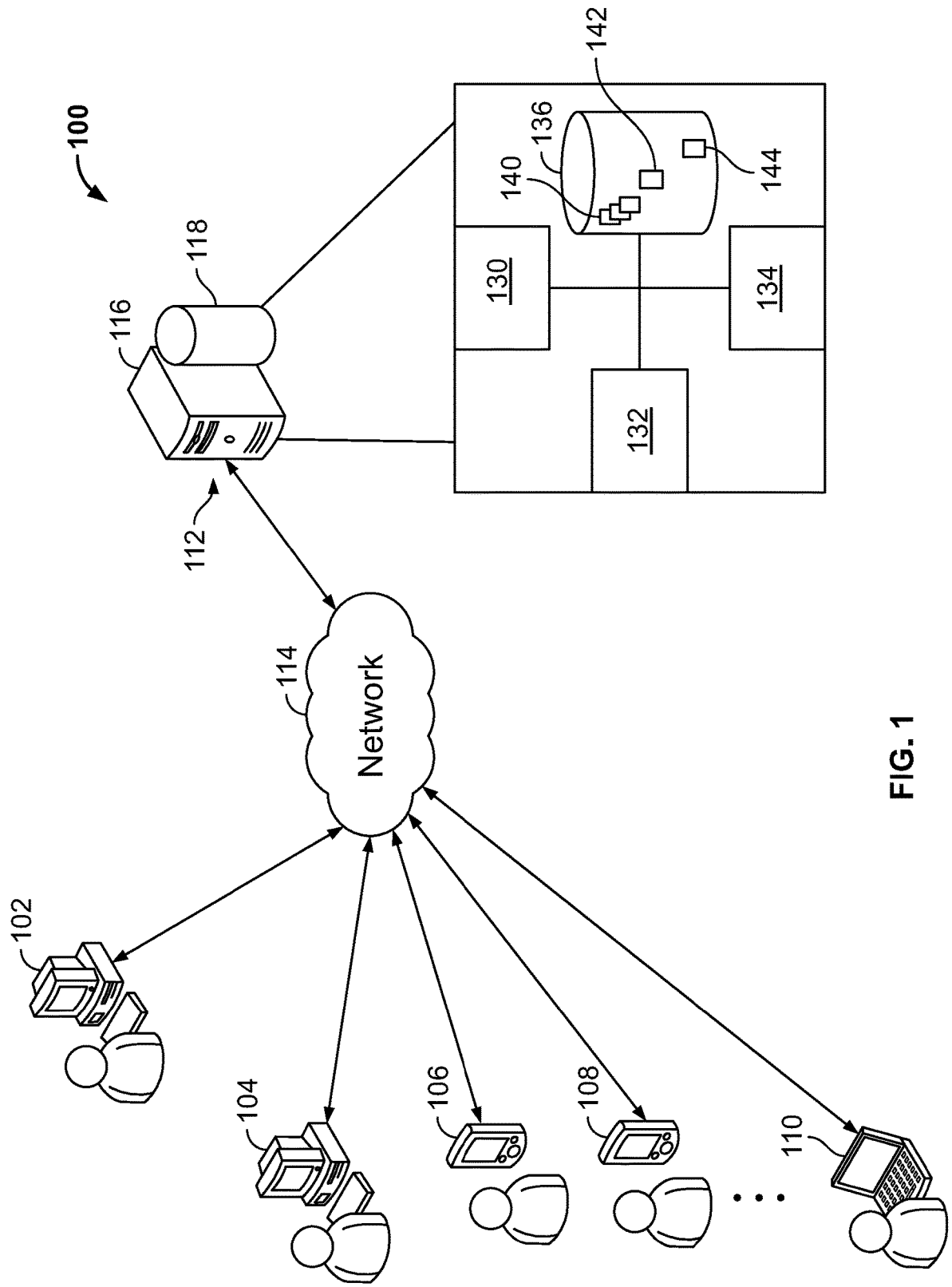
FIG. 1 illustrates an example distributed network architecture that includes one or more client devices and one or more server devices that execute well log data solver according to the present disclosure.

FIG. 1 illustrates an example distributed network architecture 100 that includes one or more client devices and one or more server devices that execute a well log data solver through a well log file service. The network architecture 100 includes a number of client devices 102, 104, 106, 108, 110 communicably connected to a structured data processing server system 112 ("server system 112") by a network 114. The server system 112 includes a server device 116 and a data store 118. The server device 116 executes computer instructions (e.g., all or a part of a well log) stored in the data store 118 to perform the functions of the well log file service. For example, in some aspects, the well log file service may be a subscription service available to the client devices 102, 104, 106, 108, and 110 (and other client devices) by an owner or operator of the server system 112. In some aspects, the server system 112 may be owned or operated by a third party (e.g., a collocation server system) that hosts the well log file service for the owner or operator of the well log file service.

Users of the client devices 102, 104, 106, 108, 110 access the server device 112 to participate in the well log file service. For example, the client devices 102, 104, 106, 108, 110 can execute web browser applications that can be used to access the well log file service. In another example, the client devices 102, 104, 106, 108, 110 can execute software applications that are specific to the well log file service (e.g., as "apps" running on smartphones). In other words, all of the well log file service may be hosted and executed on the server system 112. Or in alternative aspects, a portion of the well log file service may execute on the client devices 102, 104, 106, 108, and 110 (e.g., to receive and transmit information entered by a user of such client devices and/or to display output data from the well log file service to the user).

In some implementations, the client devices 102, 104, 106, 108, 110 can be provided as computing devices such as laptop or desktop computers, smartphones, personal digital assistants, portable media players, tablet computers, or other appropriate computing devices that can be used to communicate with an electronic social network. In some implementations, the server system 112 can be a single computing device such as a computer server. In some implementations, the server system 112 can represent more than one computing device working together to perform the actions of a server computer (e.g., cloud computing). In some implementations, the network 114 can be a public communication network (e.g., the Internet, cellular data network, dialup modems over a telephone network) or a private communications network (e.g., private LAN, leased lines).

As illustrated in FIG. 1, the server system 112 (e.g., the server device 116 and data store 118) includes one or more processing devices 132, the well log data solver 130, one or more memory modules 136, and an interface 134. Generally, each of the components of the server system 112 are communicably coupled such that the one or more processing devices 132 may execute the well log data solver 132 and access and manipulate data stored in the one or more memory modules 136. Data to be output from the server system 112, or data to be input to the server system 112, may be facilitated with the interface 134 that communicably couples the server system 112 to the network 114.

As illustrated in this example, the one or more memory modules 136 may store or references one or more well log files 140. Each of the well log files 140 may comprise or be a digital image of an original well log (which may be for example, a paper record). Typically, a well log (or "log" for short) is a record of several criteria of a well versus depth or time, or both. The record can be of one or more physical properties in or around the well. Well logs can be generated a number of different ways. For example, a wireline log can be recorded downhole and transmitted through a wireline to the surface for recordal. As another example, measurement-while-drilling (MWD) and logging while drilling (LWD) logs are also taken downhole but the measurements may be transmitted to the surface by fluid (e.g., mud) pulses, or else recorded downhole and retrieved later when the respective MWD or LWD instrument is brought to the surface.

Generally, a well log (e.g., the physical, paper copy) is a strip of paper or film with depth in one axis. As a paper record, a well log may be presented on folded paper of indeterminate length, but about 8.5 inches wide. Also, in many aspects, a well log includes a heading (or header) on a first page, a well sketch, a logging tool sketch, an insert, a main log, a repeat section, and a tail. Each physical property measurement versus depth (or time, or time and depth), such as resistivity, conductivity at various frequencies, sonic properties, active and passive nuclear measurements, dimensional measurements of the wellbore, formation fluid sampling, and formation pressure is usually referred to as a curve.

Figure 4A:

As mentioned, a first page of a well log includes a heading or header that, for example, includes relevant data on the well that is represented by the well log. Turning briefly to FIG. 4A, an example well log file 400 is shown and, more particularly, a first page 401 of well log file 400 is shown. As further shown by brackets, a header 402 is included in the first page 401 of the well log file 400. The header 402 includes information such as company name and information that ordered the well log, well name, field in which the well was drilled, county in which the well was drilled, API (American Petroleum Institute) number of the well, and other information. For instance, the other information includes elevation data of the well, such as drilling floor elevation, kelly bushing elevation, and ground elevation. Generally, the drilling floor elevation is the distance (relative to sea level) of the drill floor. The kelly bushing elevation is the elevation (relative to sea level) of the "kelly bushing" (a coupling that connects the kelly to the rotary table). The ground elevation is the elevation of the terranean surface relative to sea level.

As shown, the one or more memory modules 136 may store other portions of data that are determined or produced during execution of the well log data solver 130 to, e.g., produce one or more user-specified well log file data from the well log file 140 (as described, for example, with reference to FIGS. 2 and 3A-3E). For example, OCR'd data 142 may be stored (at least transiently), as well as parsed OCR'd data 144. Other data, either calculated or determined, generated by execution of the well log data solver 112 (as described, for example, with reference to FIGS. 2 and 3A-3E) may also be stored (even if transiently) in the one or more memory modules 136.

Figure 2:
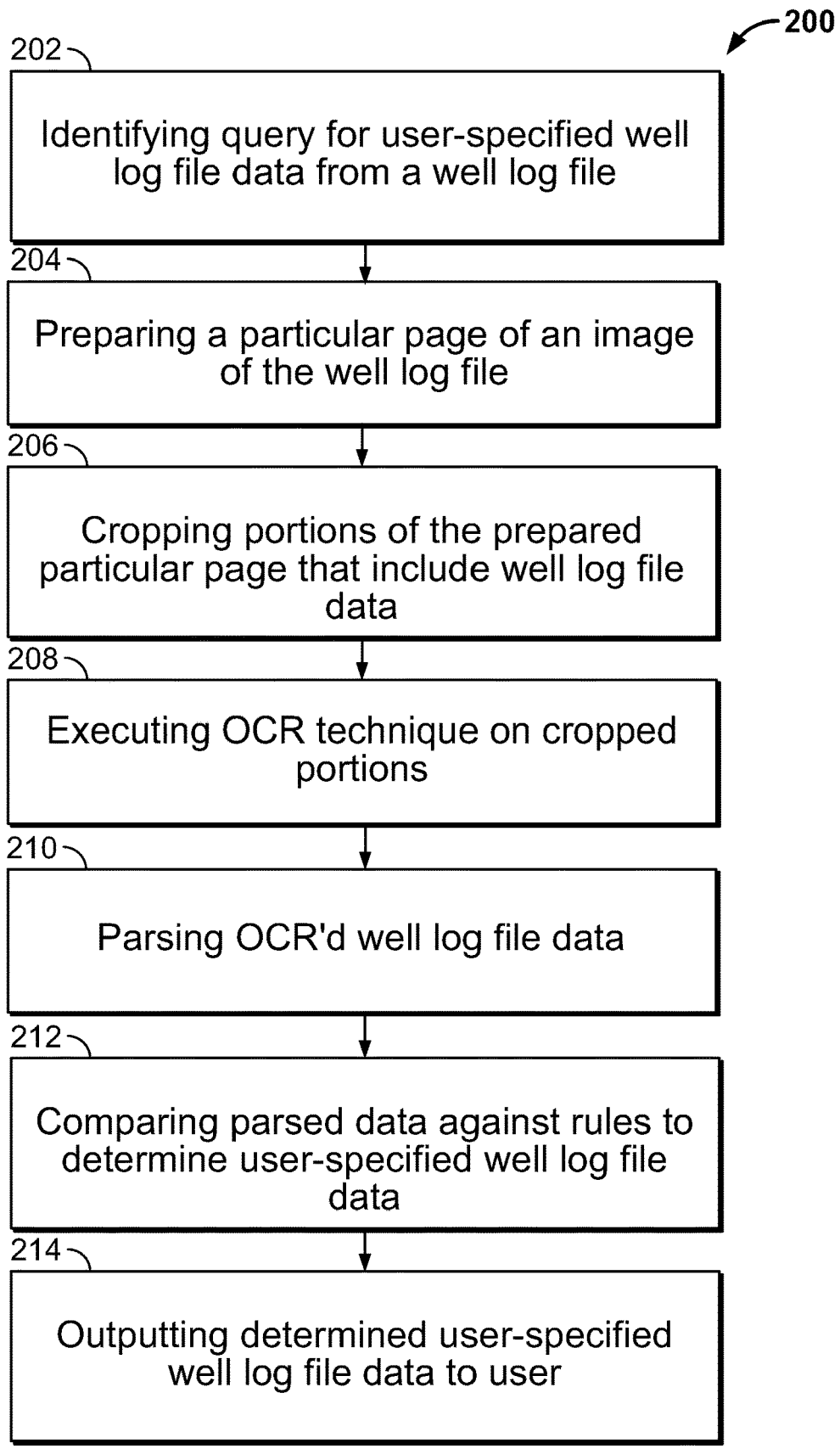
FIG. 2 illustrates an example process performed with a well log data solver to determine one or more user-specified data from a well log data file.

FIG. 2 illustrates an example process 200 performed with a well log data solver to determine one or more user-specified data from a well log data file. For example, process 200 can be performed by or with the well log data solver 130 of the structured data processing server system 112 in the distributed network architecture 100 shown in FIG. 1. In the example implementation of FIG. 2, process 200 may begin at step 202, which includes identifying a query for user-specified well log file data from a well log file. For example, in some aspects, a user of one of the client devices 102 through 110 may submit or select a particular query for well log data, such as an elevation or other well log information, from a particular well log file. In some aspects, the user may select, through a web service, the specified type of data and the well log file, e.g., from a menu or choice of such data and log files. In other aspects, the user may transmit the query for well log data and selection of well log (e.g., by API number, well name, field name, or other criteria) from the client device 102 through 110, through the network 114, and to the server system 112.

Process 200 may continue at step 204, which includes preparing a particular page of an image of the well log file. For example, the well log file image may be a digital representation of a well log (e.g., paper record), that is 6.25 inches wide and comprises many folded pages that are 8.5 inches in height. Thus, the ratio of any particular page of the well log file (and thus image of the page) is 8.5 to 6.25, or about 1.36. In some aspects, the particular page on which the queried data is located is a first page of the image of the well log file, such as located in the header (e.g., as shown with header 402 in well log page 401 in FIG. 4).

Figure 3A:
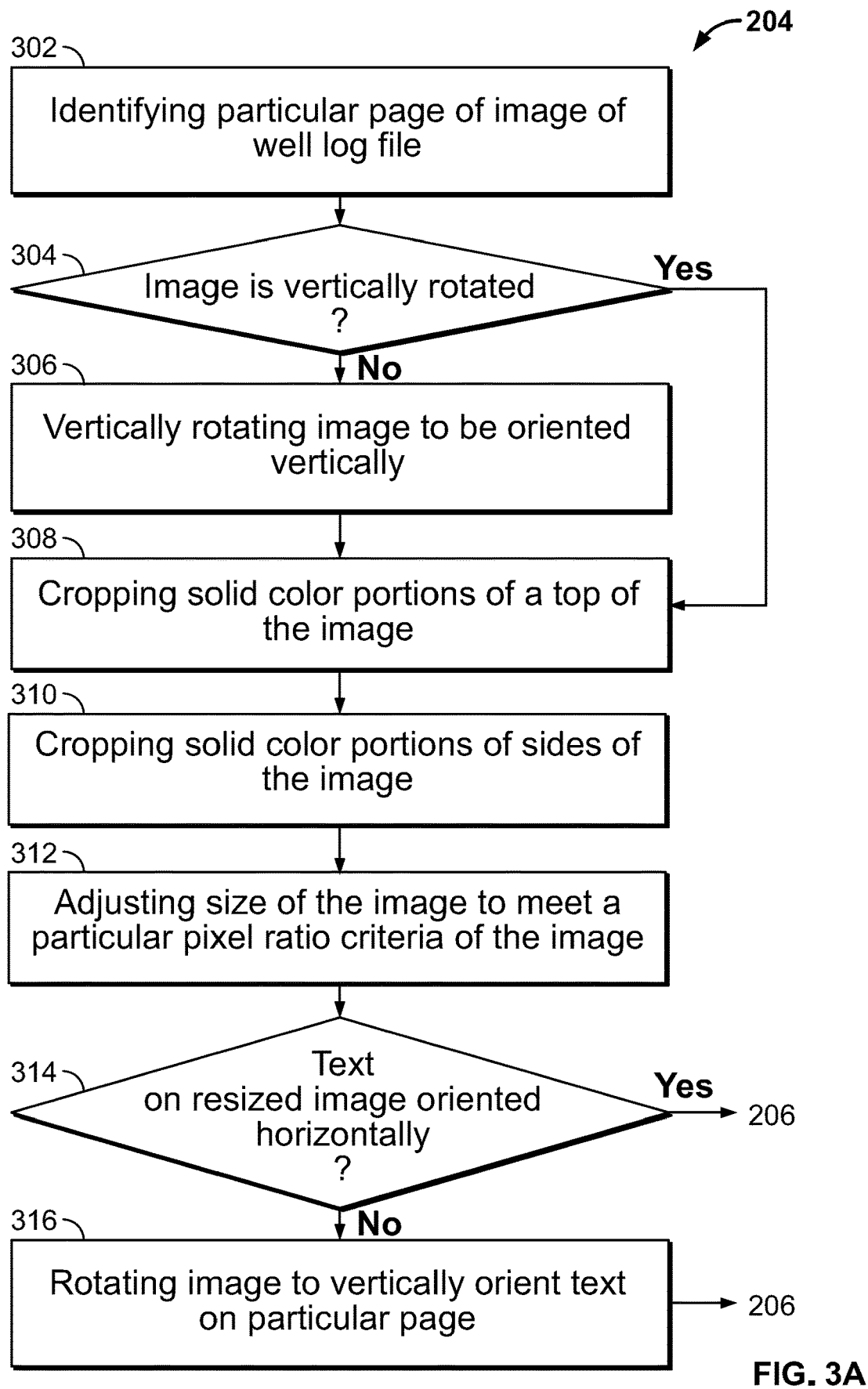
FIGS. 3A-3E illustrate example sub-processes of the process of FIG. 2 that are performed with a well log data solver to determine one or more user-specified data from a well log data file.

In some aspects, step 204 of process 200 may be implemented according to the sub-process shown in FIG. 3A. For example, step 204 may include identifying the particular page of image of well log file in step 302. For example, as noted, the header may include the user-specified well log data that is queried by the user, such as elevation data of the well (e.g., kelly bushing elevation data). Thus, the first page of the well log file image may be the particular page on which the queried data is located.

Step 204 may continue at step 304, which includes a determination of whether the image is vertically rotated. For example, as shown in FIG. 4A, the page 401 of the well log file 400 is shown vertically oriented. If the determination in step 304 is yes, then step 204 may continue at step 308 (described below). If the determination is no, then step 304 may continue at step 306, which includes vertically rotating the image to be oriented vertically such as is shown in FIG. 4A. For example, the image of the first page 401 may be rotated so that most of the text of the header 402 is vertically oriented.

Step 308, which follows from step 306 as well as a "yes" determination in step 304, includes cropping solid color portions of a top of the image. For example, in some aspects, spaces of solid white or solid black may be cropped (e.g., removed) from the top of the image of page 401.

Step 204 may continue at step 310, which includes cropping solid color portions of a side of the image. For example, in some aspects, spaces of solid white or solid black may be cropped (e.g., removed) from the sides of the image of page 401.

Step 204 may continue at step 312, which includes adjusting a size of the image to meet a particular pixel ratio criteria of the image. For example, in some aspects, the pixel ratio of the image of the well log file 400 may be less than a pixel ratio threshold. Thus, a number of pixels at the top edge of the page 401 may be measured. Since this top edge is known to correspond to 8.5 inches, the pixel to inch ratio of the top edge is determined. This same pixel to inch ratio is then applied to the side edges of the page 401 and any excess pixels along the side are vertically cropped. The excess pixels may be determined by calculating the total number of pixels that correspond to the pixel to inch ratio, where the side measurement is 6.25 inches. As shown in FIG. 4B, this cropped image 404 is shown, where a portion of the page 401 has been removed.

Step 204 may continue at step 314, which includes a determination of whether the text on the resized image is oriented horizontally. For example, as shown in the cropped image 404, the header 402 comprises most of this image 404. As shown, most of the text on the header 402 in cropped image 404 is oriented vertically. If the determination is yes, then the sub-process described in FIG. 3A returns to step 206 of FIG. 2. If the determination is no (as it is in this example), then step 314 may continue to step 316, which includes rotating the image to horizontally orient the text on the particular page. An example of the rotated image is shown in FIG. 4C, which shows the rotated image 406 that is primarily the header 402. Once the text is horizontally oriented, the sub-process of FIG. 3A may continue back to step 206 of process 200.

Process 200 may continue at step 206, which includes cropping portions of the prepared particular page that include the well log file data. For example, the rotated image 406, which primarily includes the header 202 of the first page 401 of the well log file 400, may be further cropped in order to focus on particular portions of the image 406 that include the user-specified well log data. For example, in the example of well elevation data, this information may be contained or shown in at least two portions of the image 406.

Figure 3B:
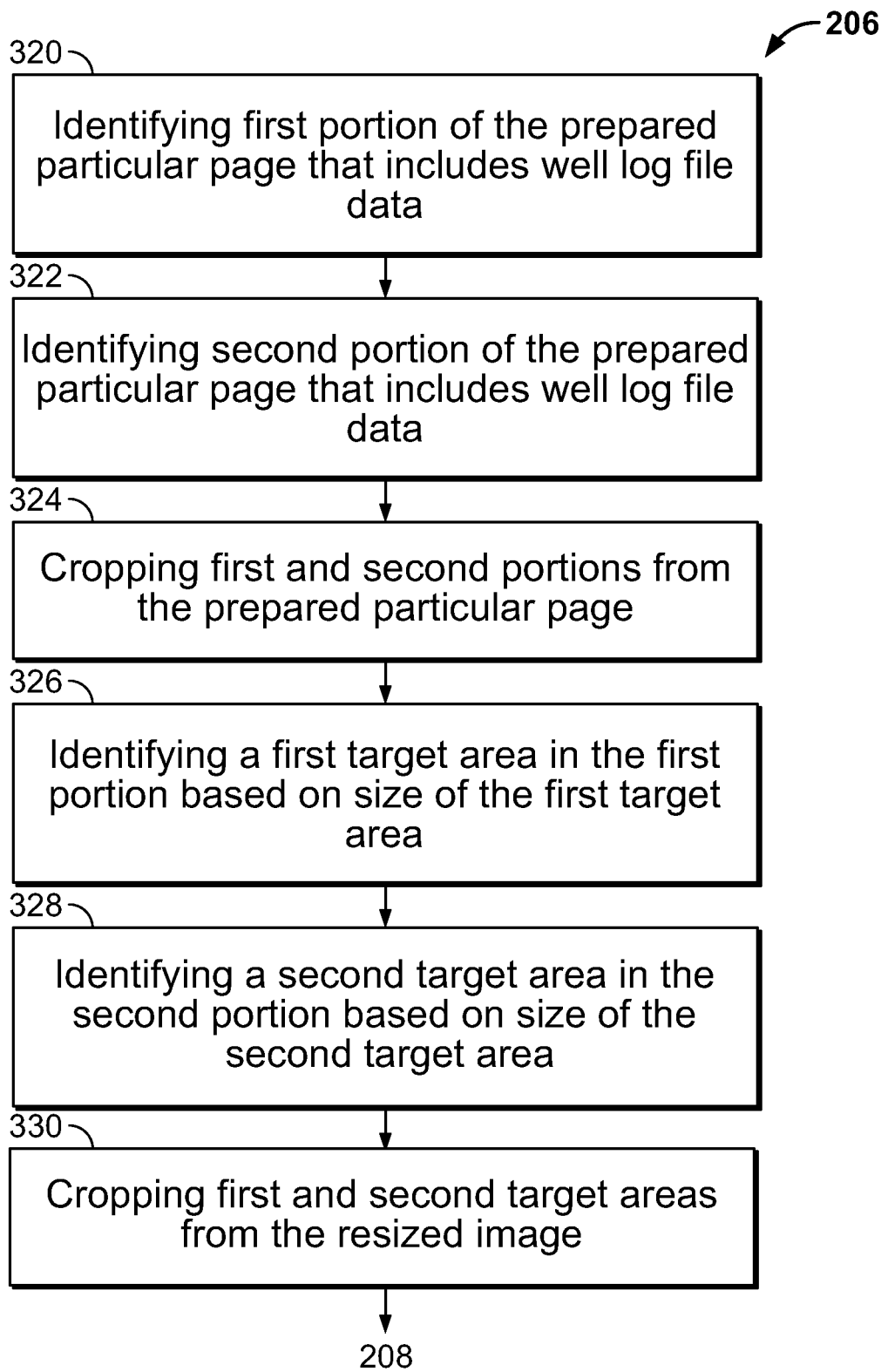
Figure 3C:
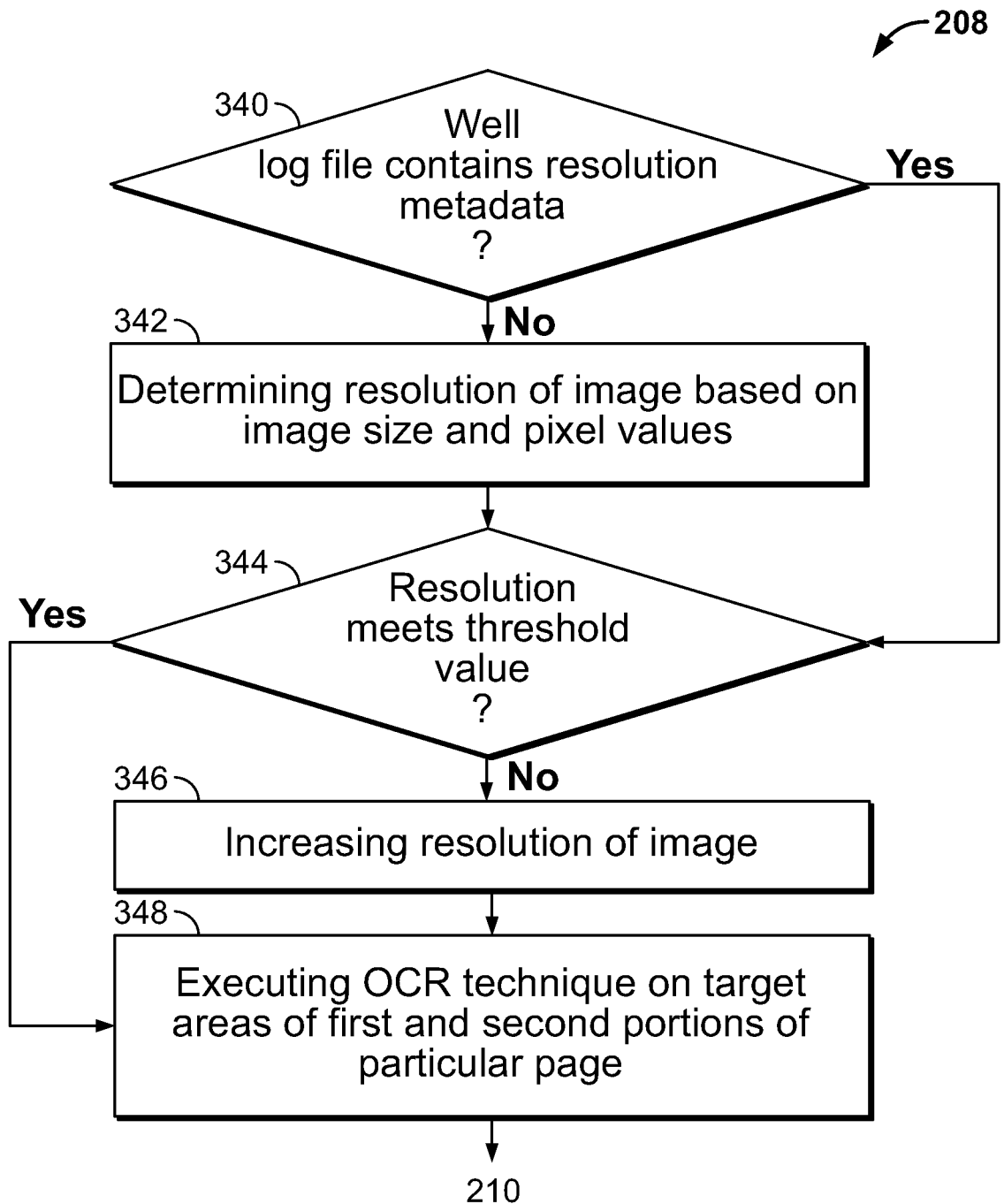
Figure 3D:
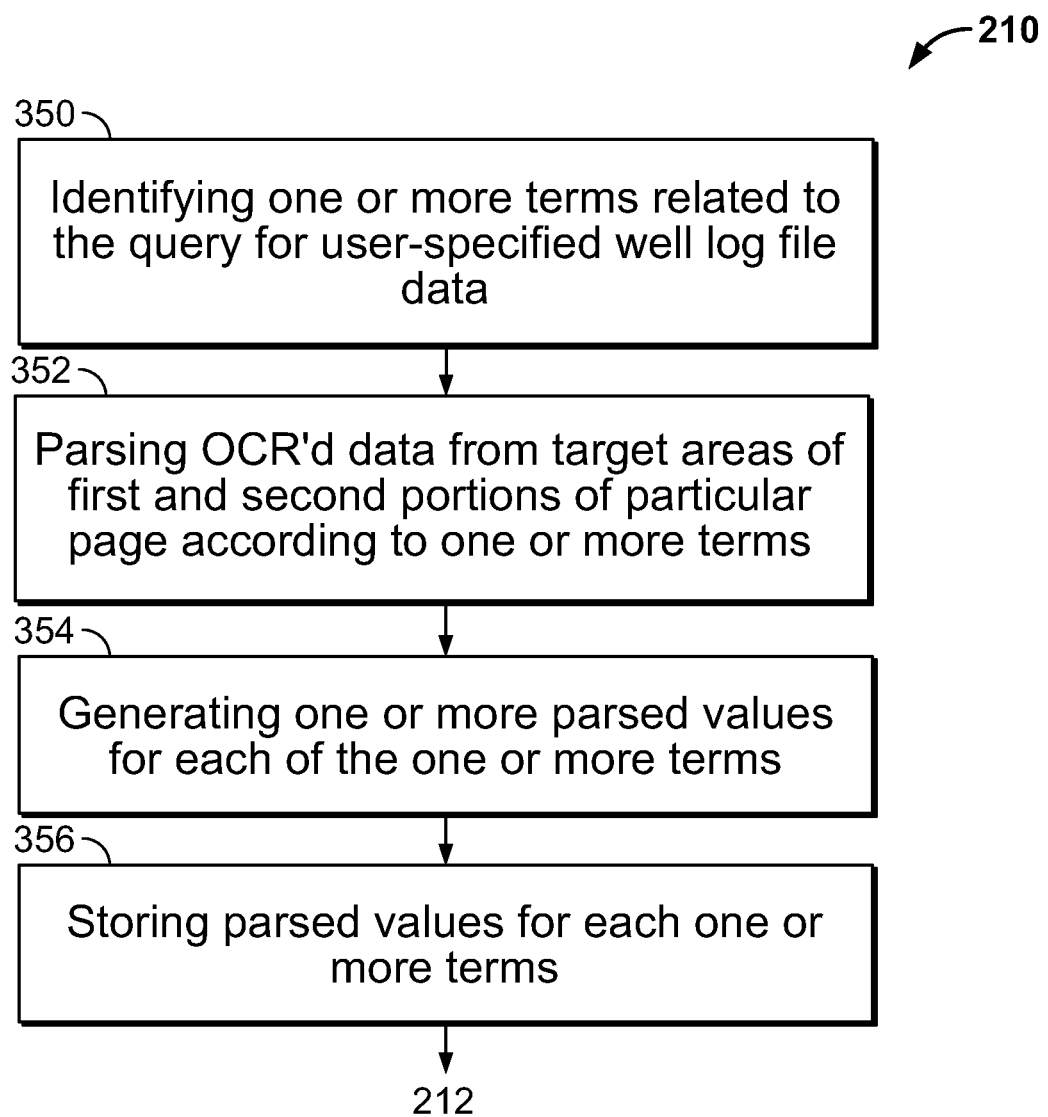
Figure 3E:
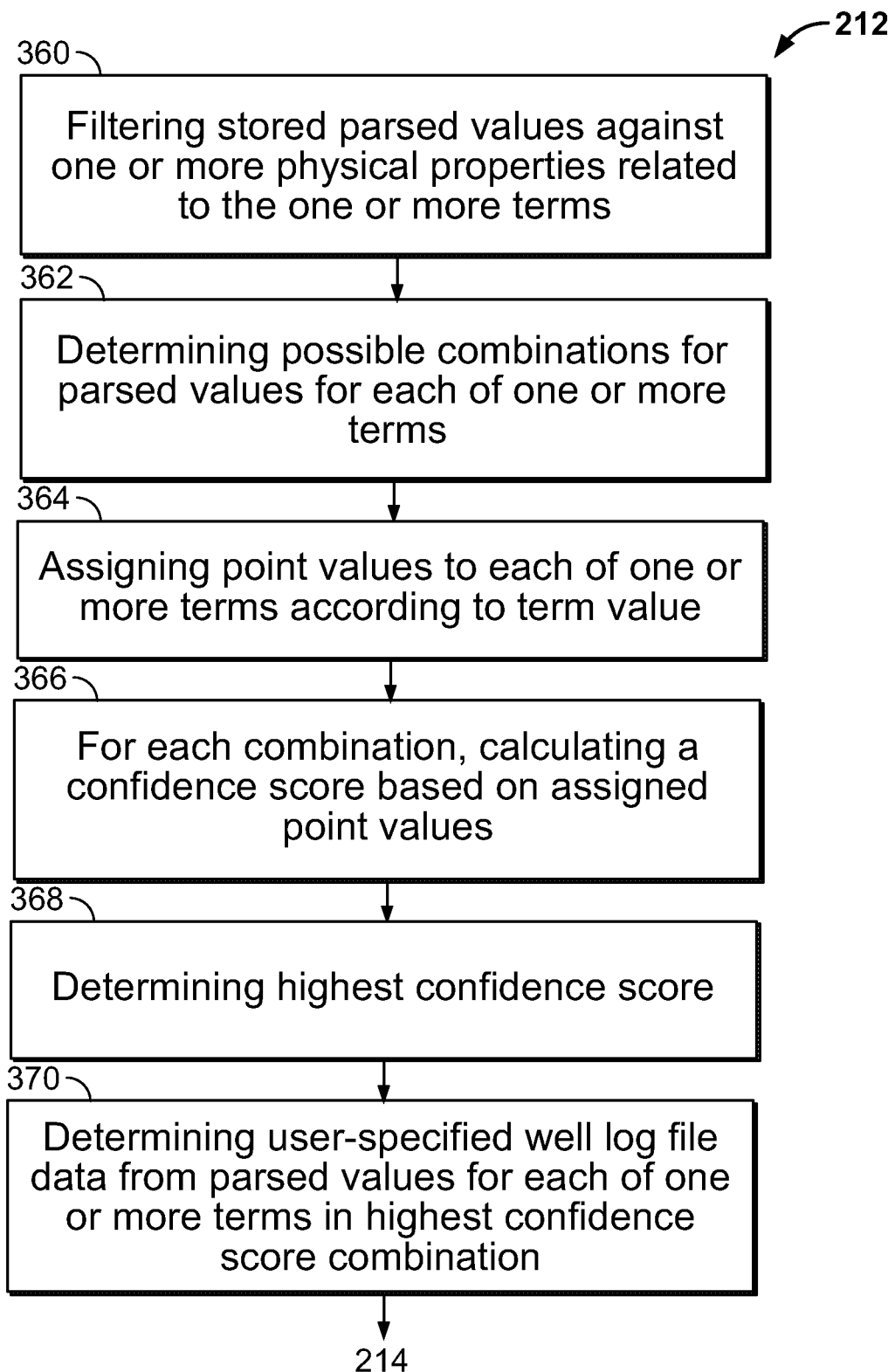

In some aspects, step 206 of process 200 may be implemented according to the sub-process shown in FIG. 3B. For example, step 206 may include identifying a first portion of the prepared particular page that includes well log file data in step 320. For example, as shown in the resized image 406, all or some of the elevation data (e.g., ground, drill floor, and kelly bushing) may be found in two different delineated portions (e.g., boxes) of the header 402. These areas of the header 402 may be consistent from well log file to well log file, i.e., these boxes are typically located in the same areas of the header 402. In some aspects, the identified first portion may contain a small, nearly square area that includes elevation data that is shown within the first portion 408 of FIG. 4D.

Step 206 may continue at step 322, which includes identifying a second portion of the prepared particular page that includes well log file data. For example, the identified second portion may contain a rectangular area that includes elevation data that is shown within the second portion 410 of FIG. 4E.

Figures 4E, 4F:
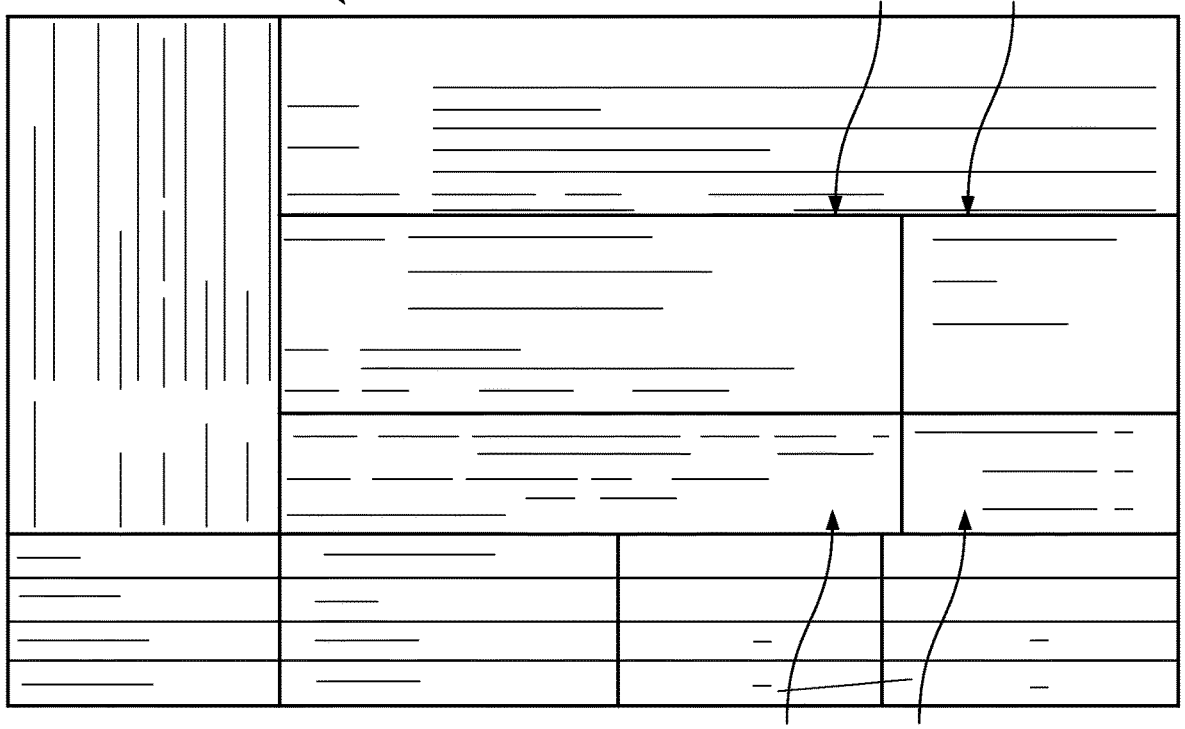

Step 206 may continue at step 324, which includes cropping the first and second portions from the prepared particular page. For example, as shown in FIG. 4E, both the first and second portions 408 and 410 are included within a cropped portion of the image 406.

Step 206 may continue at step 326, which includes identifying a first target area in the first portion based on a size of the first target area. For example, as previously described, one target area may be a square box that contains elevation data (e.g., kelly bushing, ground, and drilling floor). As shown in FIG. 4F, this first target area may be the box 412b.

Step 206 may continue at step 328, which includes identifying a second target area in the second portion based on a size of the second target area. For example, as previously described, another target area may be a rectangular box that contains elevation data (e.g., ground). As shown in FIG. 4F, this second target area may be the box 412c.

Step 206 may continue at step 330, which includes cropping the first and second target areas from the resized image. For example, as shown in FIG. 4F, the first and second portions 408 and 410 contain several target areas. The first and second target areas 412b and 412c may be cropped from the resized image. Other areas, such as boxes 412*a* and 412*d* (shown individually in FIG. 4G) may also cropped for further analysis. Other portions of the resized image may not be cropped for further analysis (e.g., because they are the wrong size or shape). Once step 330 is completed, the sub-process of FIG. 3B may continue back to step 208 of process 200.

Process 200 may continue at step 208, which includes executing an OCR technique on the cropped portions (e.g., from step 330). For example, the cropped portions 412*a*-412*d* may be OCR'd, such as by an OCR engine (e.g., Tesseract or other OCR engine). In some aspects, step 208 of process 200 may be implemented according to the sub-process shown in FIG. 3C. For example, step 208 may include making a determination of whether the well log file contains resolution metadata in step 340. For example, in some aspects, the well log file 400 may include metadata and in some cases, resolution (dots per inch or "dpi") resolution data. Such resolution data may correspond to the resolution of the well log file 400.

If the determination is no, then step 340 continues at step 342, which includes determining a resolution of the image based on image size and pixel values. For example, the resolution of the image may be calculated based on an area of the image (e.g., of the page 401) and a number of pixels in the image (e.g., in the page 401). The resolution may then be calculated based on the ratio of pixels to area of the page 401.

If the determination in step 340 is yes, and also continuing from step 342, step 208 may continue at step 344, which includes a determination of whether the resolution meets a threshold value. For example, in some aspects, OCR may be improved with greater resolution. Thus, in some aspects, a minimum or threshold resolution value may be set for the OCR engine, such as about 400 dpi. If the determination in step 344 is yes (e.g., the calculated resolution or resolution in the metadata is greater than the threshold value), then step 344 may continue at step 348 (described below).

If the determination is no, then step 344 may continue at step 346, which includes increasing the resolution of the image. For example, the cropped portions of the image (target areas 412*a*-412*d*) may be upsized or enlarged so that the resolution meets the threshold value. In some aspects, steps 340-346 may be performed prior to step 204.

Step 348, which follows from step 346 as well as a "yes" determination in step 344, includes executing the OCR technique on the target areas of the first and second portions of the particular page. For example, the OCR engine (e.g., Tesseract or other commercial engine) may OCR the target areas 412*a*-412*d* to determine the alphanumeric characters within these areas. Once the OCR process of step 348 is complete, the sub-process of FIG. 3C may continue back to step 210 of process 200.

Process 200 may continue at step 210, which includes parsing the OCR'd well log file data. For example, once the target areas 412*b* and 412*c* are OCR'd, the terms generated by the OCR process may be parsed and further evaluated. In some aspects, step 210 of process 200 may be implemented according to the sub-process shown in FIG. 3D. For example, step 210 may include identifying one or more terms related to the query for user-specified well log file data in step 350. For example, in the example of elevation data, the terms may be KB (kelly bushing elevation), DF (drilling floor elevation), GL (ground elevation), and Number Above (typically reported as "X" feet above GL). Such terms may be indicators that number values associated with the terms (e.g., as determined by the OCR process) may be representative elevation values.

Step 210 may continue at step 352, which includes parsing the OCR'd data from the target areas of the first and second portions of the particular page according to the one or more terms. For example, in some aspects, a particular set of expressions may be used to parse the elevation data according to the four terms described previously. Such expressions may be executed with an output as follows according to the example target areas 412*a*-412*d*:

```
{
    "df"; [
        [
            [
                2530.0,
                "p_df_number",
                "p.F ,. 2530 _"
            ]
        ],
        "206.parse",
        [
            [
                25380.0,
                "p_df_number",
                "p= −1 il 2 C W313 T+ o p.Fr , 25380 ___# i like!"
            ]
        ],
        "no_horizontal_line.parse",
        [
            [
                2630.0,
                "p_df_number",
                "ft above p. F, 2630 _ g PT"
            ]
        ],
        "small_elevation_box.parse"
    ],
```

Step 210 may continue at step 354, which includes generating one or more parsed values for each of the one or more terms. For instance, in this example, the parsing expressions determined that there were two values for the "DF" term, those being 2530.0 and 2630.0. Further, in this example, the parsing expression determined that there was a single KB value: 2631. Also, in this example, the parsing expression determined that there were two GL values: 2581 and 2591. Finally, in this example, the parsing expression determined that there were three Number Above values: 4, 14, and 30. Thus, there are 2*1*2*3=12 possible combinations of the parsed values.

Step 210 may continue at step 356, which includes storing the parsed values for each of the one or more terms. For example, the parsed values for each of the four example terms: DF, KB, GL, and Number Above, may be stored (at least transiently) for further analysis. Once step 356 is completed, the sub-process of FIG. 3D may continue back to step 212 of process 200.

Process 200 may continue at step 212, which includes comparing the parsed data against rules to determine the user-specified well log file data. For example, in some aspects, the OCR process may generate values for the parsed terms that are not realistic or compatible with one or more physical properties of the well for which the well log file 400 recorded the measurements. In some aspects, step 212 of process 200 may be implemented according to the sub-process shown in FIG. 3E. For example, step 212 may include filtering the stored parsed values (e.g., in step 356) against one or more physical properties related to the one or more terms in step 360. For example, elevation values parsed in step 354 may be first checked to confirm that they are within a reasonable range. Thus, in some aspects, the parsed elevation values may be filtered according to other known data of the well. For example, each well is assigned a unique API number (which is provided in the header 402 of the well log file 400). Each API number is also associated with particular longitude and latitude location values. The longitude and latitude values are then used, e.g., in a commercial map program such as Google Maps (https://www.google.com/maps/) to determine a ground elevation estimate at that location. Thus, in the case of the GL terms, filtering may include excluding any parsed value associated with the GL term that is not within a particular range of the ground elevation estimate (e.g., plus or minus 100 feet).

As another example, if ground elevation cannot be estimated (e.g., from Google Maps or otherwise), known minimum and maximum elevations within a particular county in which the well is located may be used to filter the GL term. For example, filtering may include excluding any parsed value associated with the GL term that is not within the particular range of the ground elevation bounded by the county minimum and maximum values. Such filtering could also be performed using known minimum and maximum elevations within a particular state in which the well is located. Further, such filtering could be performed for the GL term using a global minimum of 50 feet and global maximum of 12,000 feet.

Step 212 may continue at step 362, which includes determining possible combinations for parsed values for each of one or more terms. For example, as the OCR process may derive multiple values associated with each term (of KB, GL, DF, and Number Above), these parsed values may be arranged in multiple combinations of the four terms.

Step 212 may continue at step 364, which includes assigning point values to each of the one or more terms according to the term value. For example, in some aspects, point values for each of the four terms within a particular combination may be assigned based on the parsed value of that term. For example, for the KB value, 1 point may be assigned in the combination if the parsed KB value is 1 or 2 feet greater than the parsed DF value. Also for the KB value, 1 point may be assigned in the combination if the parsed KB value is no more than 50 feet greater than the parsed GL value. For the DF value, 1 point may be assigned in the combination if the parsed DF value is no more than 50 feet greater than the parsed GL value. Also, 2 points may be assigned to the combination if the sum of the parsed GL and Number Above values value equal the parsed KB value. Such point assignments may reflect, for example, the physical relationships of these elevations at the well itself.

Step 212 may continue at step 366, which includes, for each combination, calculating a confidence score based on the assigned point values. For example, a confidence score for each combination may be determined according to the point values assigned in step 366. Thus, any particular combination may receive a score between 0 and 5 in this example implementation.

Step 212 may continue at step 368, which includes determining the highest, calculated confidence score. For example, of the many possible combinations (according to the number of parsed values for each term), the highest confidence score may be identified. In the case of ties, any particular of the highest scoring combination may be chosen.

Step 212 may continue at step 370, which includes determining user-specified well log file data from the parsed values for each of one or more terms in the highest confidence score combination. For example, once the highest confidence score is determined, the parsed value for each of the four terms may be determined to be the correct elevations, and thereby the well log file data queried by the user. Once step 370 is completed, the sub-process of FIG. 3E may continue back to step 214 of process 200.

Process 200 may continue at step 214, which includes outputting the determined user-specified well log file data to a user. For example, the elevation values in the combination of parsed values that made up the highest scoring combination (as determined in steps 366-368) may be transmitted or otherwise exposed to the user on one of the client devices 102-110.

Figure 5:
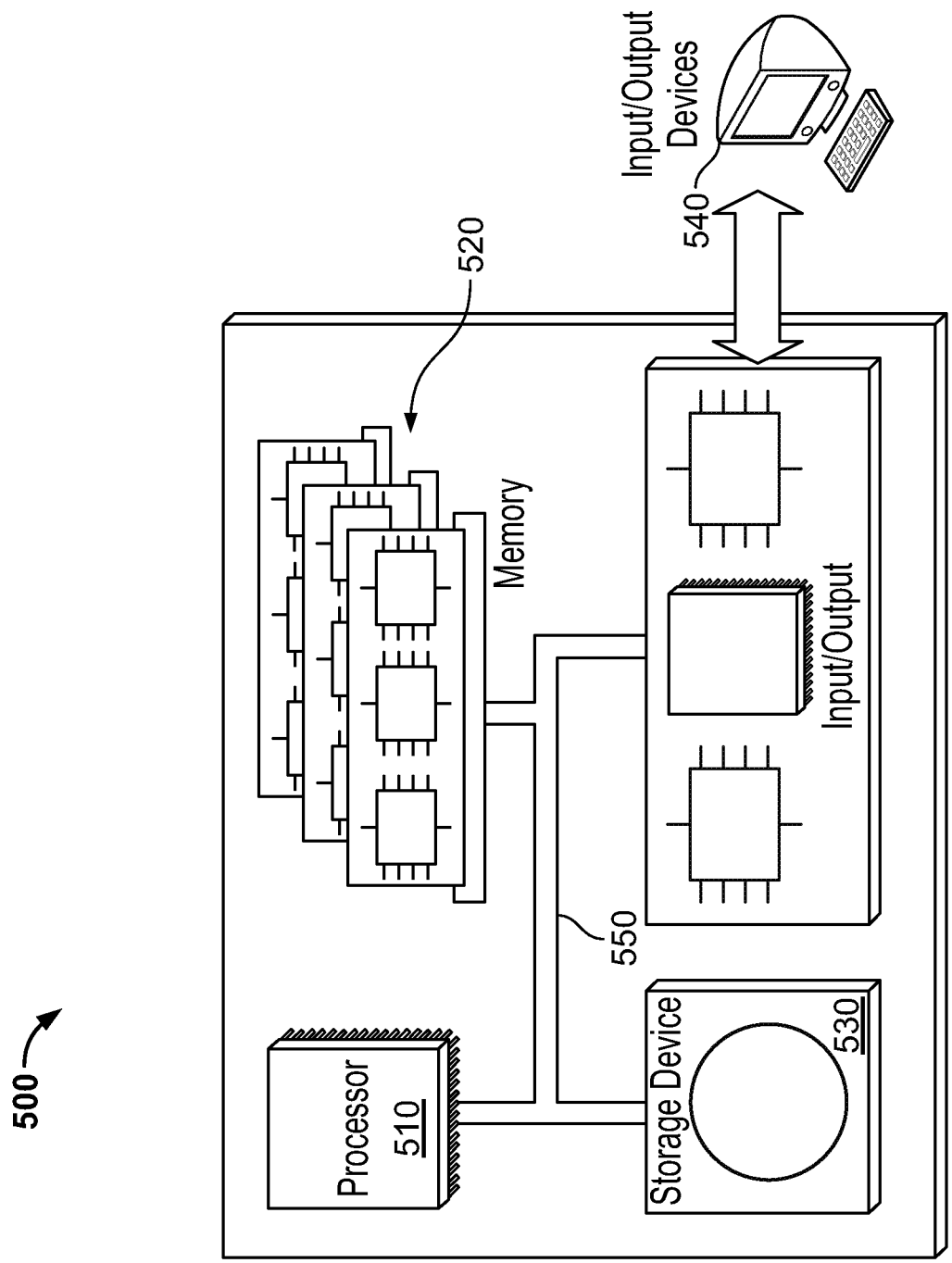
FIG. 5 is a schematic diagram of a structured data processing system that can be used for the operations described in association with any of the computer-implemented processes described herein.

FIG. 5 is a schematic diagram of a computer system 500. The system 500 can be used for the operations described in association with any of the computer-implemented methods described previously, for example as or as part of the structured data processing server system 112 or other data processing systems described herein.

The system 500 is intended to include various forms of digital computers, such as laptops, desktops, workstations, personal digital assistants, servers, blade servers, mainframes, and other appropriate computers. The system 500 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. The processor may be designed using any of a number of architectures. For example, the processor 510 may be a CISC (Complex Instruction Set Computers) processor, a RISC (Reduced Instruction Set Computer) processor, or a MISC (Minimal Instruction Set Computer) processor.

In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a control system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of embodiments have been described. Nevertheless, it will be understood that various modifications may be made without departing from the spirit and scope of what is described. For example, the steps of the exemplary flow charts in FIGS. 2 and 3A-3E may be performed in other orders, some steps may be removed, and other steps may be added. Accordingly, other embodiments are within the scope of the following claims.

What is claimed is:

1. A structured data processing system for extracting well log data, the system comprising:
   one or more hardware processors;
   a memory in communication with the one or more hardware processors, the memory storing a data structure and an execution environment, the data structure comprising an image of a well log file, the execution environment comprising:
      a well log data solver configured to perform operations comprising:
         cropping one or more portions of a particular page of the well log file image that comprises solid color space, the cropping comprising removing the one or more portions of the particular page of the well log file image that comprises solid color space;
         further cropping one or more portions of the particular page that comprises well log file data from the cropped particular page of the well log file image, the further cropping comprising excluding at least another portion of the cropped particular page from the one or more portions of the particular page that comprises well log file data;
         executing an optical character recognition (OCR) technique on the cropped one or more portions of the particular page that comprises well log file data to generate an OCR'd image of the cropped one or more portions of the particular page that comprises well log file data;

parsing the well log file data from the OCR'd image;
comparing the parsed well log file data against one or more well log file data-specific rules to determine user-specified well log file data from the parsed well log file data;
a user interface module that generates a user interface that renders one or more graphical representations of the determined user-specified well log file data; and
a transmission module that transmits, over one or more communication protocols and to a remote computing device, data that represents the one or more graphical representations.

2. The structured data processing system of claim 1, wherein the well log data solver is configured to perform further operations comprising manipulating the well log file image to vertically orient the particular page of the well log file image.

3. The structured data processing system of claim 1, wherein the well log data solver is configured to perform further operations comprising identifying, from a remote computing system, an identification of the user-specified well log file data.

4. The structured data processing system of claim 3, wherein identifying the identification of the user-specified well log file data comprises receiving, from the remote computing system, the identification of the user-specified well log file data.

5. The structured data processing system of claim 1, wherein the user-specified well log file data comprises well elevation data.

6. The structured data processing system of claim 5, wherein the elevation data comprises Kelly Bushing elevation data.

7. The structured data processing system of claim 1, wherein the particular page comprises a first page of the well log file image.

8. The structured data processing system of claim 1, wherein the well log data solver is configured to perform further operations comprising increasing a dots per inch (dpi) value of the particular page to at least 400 dpi.

9. The structured data processing system of claim 1, wherein the operation of cropping one or more portions of the particular page of the well log file image that comprises solid color space comprises:
cropping one or more solid white portions of the particular page; and
cropping one or more solid black portion of the particular page.

10. The structured data processing system of claim 9, wherein at least one or more of the solid white portions or solid black portions is part of a side or a top of the particular page.

11. The structured data processing system of claim 9, wherein the operation of cropping one or more portions of a particular page of the well log file image that comprises solid color space further comprises:
measuring a number of pixels at a top of the particular page;
vertically cropping the particular page so that a top-to-side length ratio of the particular page is 8.5 in. to 6.25 in.;
determining a text orientation of the cropped particular page; and
based on the determination, rotating the cropped particular page so that the text orientation is vertical.

12. The structured data processing system of claim 1, wherein the operation of further cropping one or more portions of the particular page that comprises well log file data from the cropped particular page of the well log file image comprises:
further cropping a first portion of the cropped particular page that includes a first representation of the user-specified well log file data; and
further cropping a second portion of the cropped particular page that includes a second representation of the user-specified well log file data.

13. The structured data processing system of claim 12, wherein the well log data solver is configured to perform further operations comprising:
identifying a first area of the cropped particular page that encloses the first portion;
determining the first portion in the first area based on a delineated size or shape of the first portion;
identifying a second area of the cropped particular page that encloses the second portion; and
determining the second portion in the second area based on a delineated size or shape of the second portion.

14. The structured data processing system of claim 13, wherein the well log data solver is configured to perform further operations comprising:
cropping a remaining portion of the first area excluded by the delineated size or shape of the first portion from the cropped particular page; and
cropping a remaining portion of the second area excluded by the delineated size or shape of the second portion from the cropped particular page.

15. The structured data processing system of claim 13, wherein the operation of executing the OCR technique on the cropped one or more portions of the particular page that comprises well log file data to generate an OCR'd image of the cropped one or more portions of the particular page that comprises well log file data comprises:
determining that a dots per inch (dpi) setting value of the cropped particular page meets a threshold setting value for the OCR technique;
determining that the cropped particular page comprises metadata that includes the dpi setting; and
executing the OCR technique on the first and second portions of the cropped particular page generate an OCR'd image of the first and second portions that include the first and second representations of the user-specified well log file data.

16. The structured data processing system of claim 15, wherein the operation of parsing the well log file data from the OCR'd image comprises:
parsing the OCR'd image of the first portion to determine a first set of separate values of each of one or more terms of interest included in the first representation of the user-specified well log file data; and
parsing the OCR'd image of the second portion to determine a second set of separate values for each of the one or more terms of interest included in the second representation of the user-specified well log file data.

17. The structured data processing system of claim 15, wherein the operation of comparing the parsed well log file data against one or more well log file data-specific rules to determine user-specified well log file data from the parsed well log file data comprises:
assigning a numerical point value based on the well log file data-specific rules to each of the one or more terms of interest;
scoring, according to the assigned numerical point value of each of the one or more terms of interest, each of a plurality of combinations of the one or more terms comprised of the first and second number of each of the one or more terms, each combination comprising a unique combination of values from the first and second sets of separate values of the one or more terms of interest;

sorting the scored plurality of combinations to determine a best score;

identifying the unique combination of values of the one or more terms of interest associated with the combination having the best score; and setting the identified unique combination of values of the one or more terms of interest to the determined user-specified well log file data.

18. The structured data processing system of claim 17, wherein at least one of the well log file data-specific rules is based on a physical property of one of the one or more terms of interest, the physical property defined by a range of values.

19. The structured data processing system of claim 18, wherein the well log data solver is configured to perform further operations comprising prior to assigning the numerical point value, filtering the first and second sets of separate values of the one of the one or more terms of interest based on the physical property.

20. The structured data processing system of claim 19, wherein the operation of filtering the first and second sets of separate values of the one of the one or more terms of interest based on the physical property comprises:

comparing each value of the one of the one or more terms of interest with the range of values; and based on the compared value being within the range of values, assigning the compared value to one of the plurality of combinations.

21. The structured data processing system of claim 20, wherein the well log data solver is configured to perform further operations comprising based on the compared value being outside of the range of values, excluding the compared value from all of the plurality of combinations.

22. A computer-implemented method for extracting well log data performed by a well log solver of a structured data processing system that comprises one or more hardware processors, a memory in communication with the one or more hardware processors and storing a data structure that comprises an image of a well log file and an execution environment that executes the well log data solver, the method comprising:

cropping one or more portions of a particular page of the well log file image that comprises solid color space, the cropping comprising removing the one or more portions of the particular page of the well log file image that comprises solid color space;

further cropping one or more portions of the particular page that comprises well log file data from the cropped particular page of the well log file image, the further cropping comprising excluding at least another portion of the cropped particular page from the one or more portions of the particular page that comprises well log file data;

executing an optical character recognition (OCR) technique on the cropped one or more portions of the particular page that comprises well log file data to generate an OCR'd image of the cropped one or more portions of the particular page that comprises well log file data;

parsing the well log file data from the OCR'd image;

comparing the parsed well log file data against one or more well log file data-specific rules to determine user-specified well log file data from the parsed well log file data;

generating a user interface that renders one or more graphical representations of the determined user-specified well log file data; and transmitting, over one or more communication protocols and to a remote computing device, data that represents the one or more graphical representations.

* * * * *